US011959754B2

(12) United States Patent
Ciupek et al.

(10) Patent No.: US 11,959,754 B2
(45) Date of Patent: Apr. 16, 2024

(54) SYSTEMS AND METHODS FOR MODIFYING AND TRANSMITTING PATROL ROUTES

(71) Applicant: Motorola Solutions, Inc., Chicago, IL (US)

(72) Inventors: Pawel Ciupek, Jaworzno (PL); Szymon Sikora, Cracow (PL); Pawel Jurzak, Cracow (PL); Tomasz Zajac, Ruda Slaska (PL)

(73) Assignee: Motorola Solutions, Inc., Chicago, IL (US)

( * ) Notice: Subject to any disclaimer, the term of this patent is extended or adjusted under 35 U.S.C. 154(b) by 29 days.

(21) Appl. No.: 17/781,982

(22) PCT Filed: Dec. 31, 2019

(86) PCT No.: PCT/PL2019/050084
§ 371 (c)(1),
(2) Date: Jun. 2, 2022

(87) PCT Pub. No.: WO2021/137707
PCT Pub. Date: Jul. 8, 2021

(65) Prior Publication Data
US 2023/0003534 A1   Jan. 5, 2023

(51) Int. Cl.
*G01C 21/34* (2006.01)
*G06Q 10/04* (2023.01)
(Continued)

(52) U.S. Cl.
CPC ....... *G01C 21/3407* (2013.01); *G06Q 10/047* (2013.01); *G06Q 50/265* (2013.01);
(Continued)

(58) Field of Classification Search
CPC ............ G01C 21/3407; G06Q 10/047; G06Q 50/265; G06Q 10/063114; H04W 4/021;
(Continued)

(56) References Cited

U.S. PATENT DOCUMENTS

| 10,325,461 | B1 * | 6/2019 | Roberts | ............... G08B 13/196 |
| 2017/0225334 | A1 * | 8/2017 | Deyle | .................. G05D 1/0094 |
| 2017/0255894 | A1 * | 9/2017 | Witkin | ........... G06Q 10/063114 |

FOREIGN PATENT DOCUMENTS

WO    WO 2017/206334 A1 * 12/2017

OTHER PUBLICATIONS

International Bureau, International Preliminary Report On Patentability, International Application No. PCT/PL2019/050084, dated Jul. 14, 2022, 9 Pages.

(Continued)

*Primary Examiner* — Brian P Sweeney
(74) *Attorney, Agent, or Firm* — Baker Botts L.L.P (57) ABSTRACT

Methods for modifying a patrol route of a safety officer include monitoring persons within geographic areas, identifying a safety officer, tracking an elapsed time value for each of the persons indicating a respective quantity of time since a person has been within a threshold proximity to the safety officer, determining a total elapsed time value for each of the geographic areas based on the respective elapsed time values for each of the persons currently located in the geographic area, determining that a patrol route of the safety officer should be modified based on the total elapsed time value for each of the geographic areas, modifying the patrol route of the safety officer, and transmitting the modified patrol route to the safety officer. The modified patrol route indicates that the safety officer is to patrol a given geographic area of the geographic areas.

20 Claims, 6 Drawing Sheets

(51) Int. Cl.
*G06Q 10/047* (2023.01)
*G06Q 50/26* (2012.01)
*H04W 4/02* (2018.01)
*H04W 4/021* (2018.01)
*H04W 4/024* (2018.01)
*H04W 4/029* (2018.01)
*H04W 4/80* (2018.01)

(52) U.S. Cl.
CPC ........... *H04W 4/021* (2013.01); *H04W 4/023* (2013.01); *H04W 4/024* (2018.02); *H04W 4/029* (2018.02); *H04W 4/80* (2018.02)

(58) Field of Classification Search
CPC ..... H04W 4/023; H04W 4/024; H04W 4/029; H04W 4/80
See application file for complete search history.

(56) References Cited

OTHER PUBLICATIONS

International Search Report and Written Opinion for International application No. PCT/PL2019/050084, dated Sep. 28, 2020.

\* cited by examiner

SYSTEMS AND METHODS FOR MODIFYING AND TRANSMITTING PATROL ROUTES

CROSS-REFERENCE TO RELATED APPLICATIONS

The present application is a U.S. National Stage Application of International Application No. PCT/PL2019/050084 filed Dec. 31, 2019, which is incorporated herein by reference in its entirety.

BACKGROUND OF THE INVENTION

Safety organizations typically dispatch safety officers to patrol designated routes throughout geographic areas to help the public feel safe. These designated routes, or "patrol routes," may routinely position a safety officer within specific geographic areas during certain times of day. As a result, patrol routes may cause safety officers to regularly patrol the same designated patrol routes at certain times throughout a given day. In one example, a patrol route that includes a public high school may cause a safety officer to routinely patrol an area near the public high school once in the morning and again in the afternoon. In another example, a safety officer may regularly patrol a patrol route through a downtown area in the afternoon as workers are leaving their respective workplaces. However, such patrol routes may not account for people in nearby, or surrounding, geographic areas outside of the regularly designated patrol routes. As a result, people in certain geographic areas may not be in the presence of a safety officer for several hours, or days, despite being located proximate to the regularly designated patrol route. Additionally, such patrol routes may cause recurring patterns in which safety officers regularly encounter the same people while on patrol during specific times of day.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems and methods for modifying and transmitting patrol routes. In one embodiment, a disclosed method for modifying and transmitting patrol routes includes monitoring, by an electronic computing device, a plurality of persons within a plurality of geographic areas, each of the plurality of persons located within a geographic area of the plurality of geographic areas, each of the plurality of persons being associated with a respective characteristic; identifying, by the electronic computing device, a safety officer; tracking, for each of the plurality of persons, an elapsed time value indicating a respective quantity of time since the person has been within a threshold proximity to the safety officer; determining, for each of the plurality of geographic areas, a total elapsed time value for the geographic area based on the respective elapsed time values for each of the plurality of persons currently located in the geographic area; determining, based on the total elapsed time value for each of the plurality of geographic areas, that a patrol route of the safety officer should be modified; modifying the patrol route of the safety officer, the modified patrol route indicating that the safety officer is to patrol a given geographic area of the plurality of geographic areas; and transmitting the modified patrol route to the safety officer.

In one or more of the disclosed embodiments, determining that the patrol route of the safety officer should be modified includes: determining that the total elapsed time value for the given geographic area of the plurality of geographic areas is above a threshold elapsed time value.

In one or more of the disclosed embodiments, determining that the patrol route of the safety officer should be modified includes: determining that the total elapsed time value for the given geographic area of the plurality of geographic areas is above the respective total elapsed time values for each of the plurality of geographic areas.

In one or more of the disclosed embodiments, the method further includes: detecting, by the electronic computing device, an instance in which a given person of the plurality of persons is within the threshold proximity to the safety officer; and causing the elapsed time value for the given person to be reset to zero.

In one or more of the disclosed embodiments, for each of the plurality of geographic areas, determining the total elapsed time value includes at least one of: determining a sum of the respective elapsed time values for each of the plurality of persons currently within the geographic area; determining an average of the respective elapsed time values for each of the plurality of persons currently within the geographic area; and determining a median of the respective elapsed time values for each of the plurality of persons currently within the geographic area.

In one or more of the disclosed embodiments, monitoring the plurality of persons within the plurality of geographic areas includes, for at least one of the plurality of persons: identifying the respective characteristic of the person; and tracking a location of the person within the plurality of geographic areas based on the identified respective characteristic.

In one or more of the disclosed embodiments, monitoring the plurality of persons within the plurality of geographic areas includes, for at least one of the plurality of persons: detecting a radio-frequency identification (RFID) associated with the person, the RFID being stored in an electronic tag associated with the person; and tracking a location of the person based on the detected RFID.

In one or more of the disclosed embodiments, monitoring the plurality of persons within the plurality of geographic areas includes, for at least one of the plurality of persons: obtaining, from an application executing on a mobile computing device associated with the person, location information for the person; and tracking a location of the person based on the obtained location information.

In one or more of the disclosed embodiments, the method further includes: generating, by the electronic computing device, a predicted patrol route for the safety officer at a given a time of day, the predicted patrol route indicating a given geographic area of the plurality of geographic areas predicted to have a total elapsed time value that is above a threshold elapsed time value at the given time of day; transmitting the predicted patrol route to the safety officer; determining that the total elapsed time value of the given geographic area is above the threshold elapsed time value at the given time of day; and in response to determining that the total elapsed time value is above the threshold elapsed time value at the given time of day, updating the modified patrol route of the safety officer based on the predicted patrol route.

In one or more of the disclosed embodiments, transmitting the modified patrol route to the safety officer includes: transmitting a heatmap to a portable electronic communication device associated with the safety officer for display, the heatmap including a visualization of the plurality of geographic areas and a plurality of colors, each of the plurality of colors indicting the total elapsed time value for a respective geographic area.

In one or more of the disclosed embodiments, monitoring the plurality of persons in the plurality of geographic areas further includes: determining that the respective characteristic associated with a given person of the plurality of persons cannot be identified by the electronic computing device; and causing the elapsed time value for the given person to be set to a default elapsed time value greater than zero.

In one or more of the disclosed embodiments, for each of the plurality of geographic areas, determining the total elapsed time value for the geographic area further includes: identifying, for each of the plurality of persons currently located in the geographic area, the respective characteristic associated with the person; determining, for each of the plurality of persons currently located in the geographic area, a weight indicating a respective priority for the safety officer to be within the threshold proximity to the person, the weight based on the identified respective characteristic associated with the person; and modifying, for each of the plurality of persons currently located in the geographic area, the respective elapsed time value for the person dependent on the determined weight.

In one or more of the disclosed embodiments, a computer readable medium storing program instructions executable by a processor is disclosed. The program instructions are executable by the processor for performing: monitoring a plurality of persons within a plurality of geographic areas, each of the plurality of persons located within a geographic area of the plurality of geographic areas, each of the plurality of persons being associated with a respective characteristic; identifying a safety officer; tracking, for each of the plurality of persons, an elapsed time value indicating a respective quantity of time since the person has been within a threshold proximity to the safety officer; determining, for each of the plurality of geographic areas, a total elapsed time value for the geographic area based on the respective elapsed time values for each of the plurality of persons currently located in the geographic area; determining, based on the total elapsed time value for each of the plurality of geographic areas, that a patrol route of the safety officer should be modified; modifying the patrol route of the safety officer, the modified patrol route indicating that the safety officer is to patrol a given geographic area of the plurality of geographic areas; and transmitting the modified patrol route to the safety officer.

In one or more of the disclosed embodiments, a disclosed patrol route modification system includes: a plurality of monitoring devices disposed throughout a plurality of geographic areas; an electronic computing device configured to: monitor a plurality of persons within the plurality of geographic areas, each of the plurality of persons located within a geographic area of the plurality of geographic areas, each of the plurality of persons being associated with a respective characteristic; identify, by the electronic computing device, a safety officer; track, for each of the plurality of persons, an elapsed time value indicating a respective quantity of time since the person has been within a threshold proximity to the safety officer; determine, for each of the plurality of geographic areas, a total elapsed time value for the geographic area based on the respective elapsed time values for each of the plurality of persons currently located in the geographic area; determine, based on the total elapsed time value for each of the plurality of geographic areas, that a patrol route of the safety officer should be modified; modify the patrol route of the safety officer, the modified patrol route indicating that the safety officer is to patrol a given geographic area of the plurality of geographic areas; and transmit the modified patrol route to the safety officer.

Figure 1:
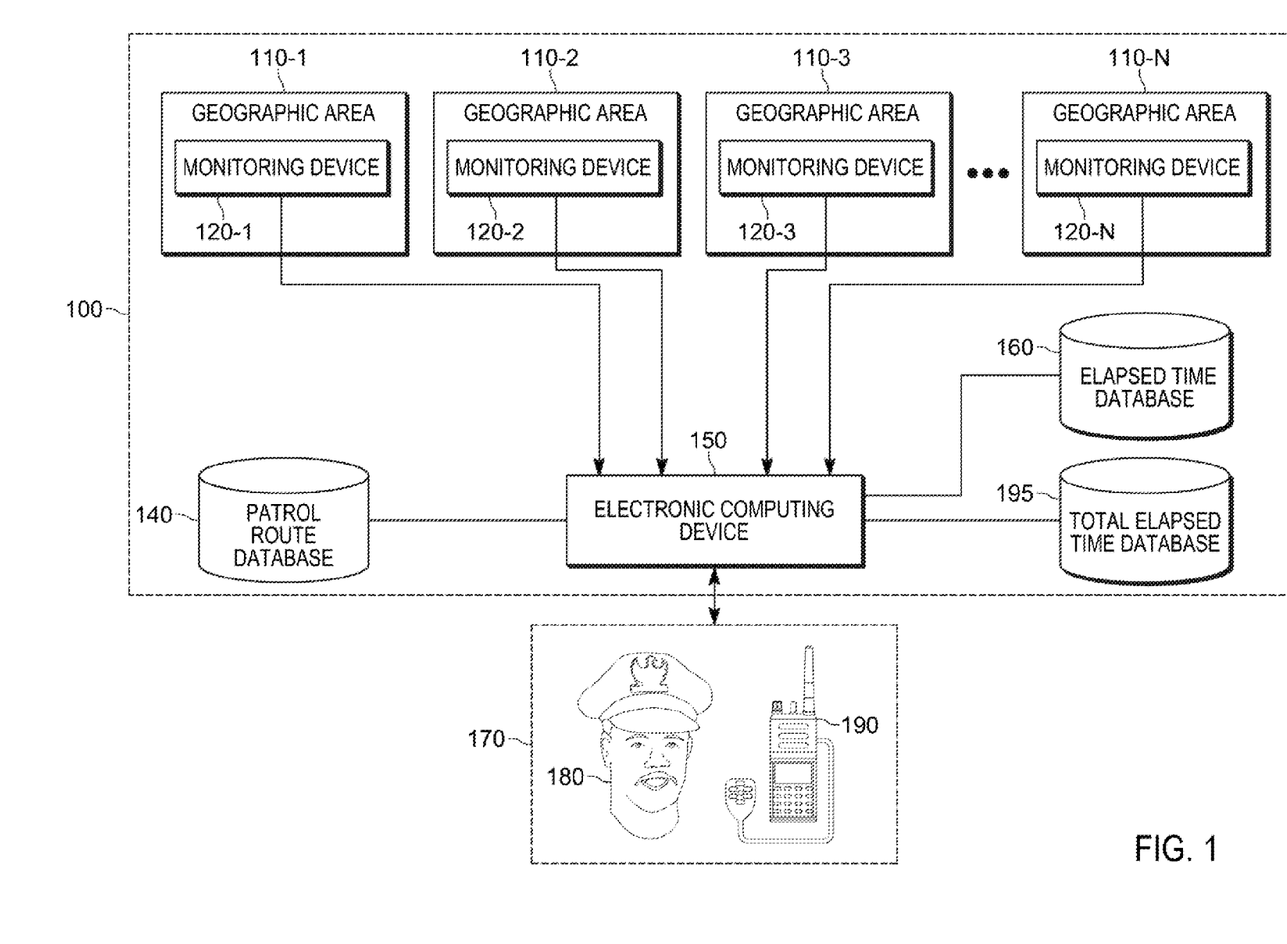
FIG. 1 illustrates a block diagram of selected elements of an example patrol route modification system, in accordance with some embodiments.

FIG. 1 illustrates a block diagram of selected elements of an example patrol route modification system, in accordance with some embodiments. In the embodiment illustrated in FIG. 1, patrol route modification system 100 includes an electronic computing device 150, a patrol route database 140, an elapsed time database 160, a total elapsed time database 195, and monitoring devices 120-1 through 120-N (collectively referred to herein as "monitoring devices 120") located in geographic areas 110-1 through 110-N (collectively referred to herein as "geographic areas 110"), respectively. As illustrated in FIG. 1, patrol route modification system 100 may communicate with a safety organization 170 that includes a safety officer 180 and a portable electronic communication device 190. In other embodiments, patrol route modification system 100 may include additional, fewer, or any combination of elements suitable for modifying and transmitting a patrol route of a safety officer.

In one embodiment, safety organization 170 may be or include a public and/or private safety entity designated to ensure the protection of persons, organizations, and institutions. In the example illustrated in FIG. 1, safety organization 170 includes a safety officer 180 and a portable electronic communication device 190. Safety organization 170 may dispatch safety officer 180 according to a patrol route and may communicate with safety officer 180 via portable electronic communication device 190. Safety organization 170 may communicate with patrol route modification system 100 to receive a modified patrol route, for example, via a network. In one embodiment, safety officer 180 may electronically receive (e.g., via one or more wired and/or wireless networks) a modified patrol route from patrol route modification system 100 via portable electronic communication device 190. In another embodiment, safety officer 180 may receive a modified patrol route from safety organization 170 in response to patrol route modification system 100 determining that a patrol route of the safety officer 180 should be modified. In one embodiment, safety organization 170 may be a public safety organization that includes public safety officers. For example, safety organization 170 may be a police department in which safety officer 180 serves the public as a police officer representing civil authority of government and authorized to carry weapons, make arrests, and enforce local, state, and federal laws. In another embodiment, safety organization 170 may be a private safety organization that includes private safety officers. For example, safety organization 170 may be a campus police department for a private university in which safety officer 180 serves as a campus police officer to protect students and private property. In other embodiments, safety organization 170 may include safety officers 180 serving as security guards, staff employed by a private enterprise such as a company, or any combination of public and/or private safety personnel employed to protect persons, organizations, and institutions.

In some embodiments, each of the geographic areas 110 may represent a respective portion of a geographic location to be patrolled by safety officer 180. In the embodiment illustrated in FIG. 1, each of the geographic areas 110 may include a respective monitoring device 120. In one embodiment, a geographic location may be partitioned into geographic areas 110 such that the total area comprising the geographic location is represented by respective geographic areas 110. In this embodiment, the total area comprising the geographic location may be monitored by monitoring devices 120, for example, using a monitoring device 120 for each of the geographic areas 110. In one embodiment, a facility may be partitioned according to a grid system in which each geographic area 110 operates as a respective unit in a grid of the overall facility. Here, the entire facility may be monitored by the monitoring devices 120 included in each respective geographic area 110. In another embodiment, a geographic location may be partitioned into geographic areas 110 such that relevant portions of the total area comprising the geographic location are represented by respective geographic areas 110. In this embodiment, only the relevant portions of the geographic location may be monitored by monitoring devices 120. For example, a city park may be partitioned according to areas accessible to, or frequented by, the public in which each accessible, or frequented, area is represented by a geographic area 110. Here, areas of the city park that are not accessible or frequented by the public, such as locked municipal property, may be irrelevant for monitoring by monitoring devices 120 and may, therefore, not warrant representation by a geographic area 110.

In some embodiments, each of the monitoring devices 120 may comprise a system, device, or apparatus operable to capture information associated with persons located within geographic areas 110. In particular, each of the monitoring devices 120 may capture information used to identify one or more respective characteristics associated with each person within a geographic area 110. In one embodiment, each of the monitoring devices 120 may be or include an audio capture device, an image capture device, a video capture device, a private security monitoring system, or a public safety monitoring system. In other embodiments, each of the monitoring devices 120 may include electrical, mechanical, or environmental sensors, radio frequency identification (RFID) sensors, or other measuring devices suitable for capturing the state of geographic areas 110 in which they are deployed. In some embodiments, each of the monitoring devices 120 deployed throughout a geographic location may be of the same type. In other embodiments, each of the monitoring devices 120 deployed throughout a geographic location may be of two or more types. In some embodiments, monitoring devices 120 may be used to uniquely identify (e.g., absolutely using a back-end database or relatively and sufficiently only for distinguishing others) persons and/or safety officers appearing at or near them. It is noted that although each of the geographic areas 110 illustrated in FIG. 1 includes a single monitoring device 120, in other embodiments each of the geographic areas 110 may include any number of monitoring devices 120 suitable for capturing information associated with persons located within geographic areas 110.

As depicted in FIG. 1, patrol route database 140 may comprise a system, device, or apparatus operable to electronically store one or more patrol routes associated with a geographic location. Specifically, patrol route database 140 may be or include a structured repository for patrol routes in which each entry corresponds to a geographic location that safety officer 180 is to patrol. In one embodiment, each entry in patrol route database 140 may be comprised of a set of numerical coordinates, such as x and y coordinates within a Cartesian coordinate system, corresponding to one or more geographic areas 110 within a geographic location. The set of numerical coordinates may be mapped to a series of geographic areas 110 within the geographic location that comprise the patrol route for the geographic location. That is, safety officer 180 may patrol the series of geographic areas 110 as indicated by the set of numerical coordinates to complete the patrol route for the geographic location. In another embodiment, each entry in the patrol route database 140 may include an image, such as a satellite image or current floorplan, of a geographic location and the geographic areas 110 therein. The geographic areas 110 comprising the patrol route for the geographic location may be highlighted, or otherwise indicated, within the image such that safety officer 180 may patrol the highlighted geographic areas 110 to complete the patrol route. In one embodiment, patrol route database 140 may be or include a relational database comprised of tables from which patrol route data may be accessed by electronic computing device 150 or an administrator of patrol route modification system 100, for example, using an application programming interface (API). In other embodiments, patrol route database 140 may be or include a centralized database, distributed database, commercial database, operational database, or any other database management system suitable for electronically storing one or more patrol routes associated with geographic locations.

As depicted in FIG. 1, elapsed time database 160 may comprise a system, device, or apparatus operable to electronically store one or more elapsed time values associated with persons located within a geographic location. Each person in the geographic location may be associated with an entry stored in elapsed time database 160. Specifically, each entry stored in elapsed time database 160 may indicate a respective quantity of time, or an "elapsed time value," since a person in the geographic location has been located near, or within a "threshold proximity" to, a safety officer 180 patrolling the geographic location. That is, elapsed time database 160 may indicate, for a person, a respective quantity of time since the person has been located within the same geographic area 110 as a safety officer 180 patrolling the geographic location. In one embodiment, elapsed time database 160 may be or include a relational database comprised of tables in which each table corresponds to a person in the geographic location. Each table may include a respective characteristic associated with the person, an elapsed time value associated with the person, and a geographic area 110 identifier, such as numerical coordinates indicating boundaries of the geographic area 110, indicating the geographic area 110 in which the person is currently located. For example, if at 5:00 pm on a given day, a person wearing a green sweatshirt located in geographic area 110-1 (shown in FIG. 1) has not been within the threshold proximity to a safety officer 180 since 8:00 am that morning, an elapsed time database 160 entry for the person may indicate that the person is wearing a green sweatshirt, include an elapsed time value of nine hours, and indicate that the person is currently located in geographic area 110-1. In other embodiments, elapsed time database 160 may be or include a centralized database, distributed database, commercial database, operational database, or any other database management system suitable for electronically storing one or more elapsed time values associated with persons located within a geographic location.

As depicted in FIG. 1, total elapsed time database 195 may comprise a system, device, or apparatus operable to electronically store one or more total elapsed time values associated with geographic areas 110 within a geographic location. Each geographic area 110 in a geographic location may be associated with an entry stored in total elapsed time database 195. In particular, each entry stored in total elapsed time database 195 may indicate a respective total quantity of time, or a "total elapsed time value," in which persons located in a geographic area 110 have not been within a threshold proximity to a safety officer 180 patrolling the geographic location. That is, total elapsed time database 195 may indicate, for a geographic area 110, a total elapsed time value comprised of respective elapsed time values for each person within the geographic area 110. In one embodiment, total elapsed time database 195 may be or include a relational database comprised of tables in which each table corresponds to a geographic area 110 in the geographic location. In one embodiment, each table may include a geographic area 110 identifier and a total elapsed time value associated with the geographic area 110. In another embodiment, each table may additionally include a number of persons currently located within the geographic area 110 whose respective elapsed time values comprise the total elapsed time value associated with the geographic area 110. In particular, each table may include a respective characteristic identifying a person, or persons, currently in the geographic area 110. For example, if two persons having respective elapsed time values of five hours and two hours are currently located in geographic area 110-1 (shown in FIG. 1), a total elapsed time database 195 entry for geographic area 110-1 may include numerical coordinates indicating boundaries of geographic area 110-1, a total elapsed time value of seven hours, and the respective characteristics associated with the two persons. In other embodiments, total elapsed time database 195 may be or include a centralized database, distributed database, commercial database, operational database, or any other database management system suitable for electronically storing one or more total elapsed time values associated with geographic areas 110 within a geographic location.

As depicted in FIG. 1, electronic computing device 150 may comprise a system, device, or apparatus operable to modify a patrol route for a safety officer 180 patrolling a geographic location. In particular, electronic computing device 150 may modify a patrol route for a safety officer 180 based on respective elapsed time values associated with persons and/or total elapsed time values associated with geographic areas 110 within a geographic location. In the embodiment illustrated in FIG. 1, electronic computing device 150 may communicate with safety organization 170 such that electronic computing device 150 may transmit a modified patrol route to safety officer 180 via portable electronic communication device 190. In other embodiments, electronic computing device 150 may transmit a modified patrol route to safety organization 170 such that safety organization 170 may notify safety officer 180 of the modified patrol route accordingly.

In one embodiment, electronic computing device 150 may monitor each person within each of the geographic areas 110 in a geographic location. Specifically, electronic computing device 150 may receive information captured by monitoring devices 120 and use the captured information to identify one or more respective characteristics associated with each person within a geographic area 110. In one embodiment, electronic computing device 150 may identify a respective characteristic associated with a given person based on visual characteristics. For example, electronic computing device 150 may process digital images captured by monitoring devices 120 using computer vision algorithms to identify and classify respective characteristics associated with persons within a geographic location. Examples of respective characteristics associated with persons in a geographic location may include an article of clothing currently worn by a person in a geographic area 110, particular markings such as birthmarks or tattoos on a person in a geographic area 110, a height of a person in a geographic area 110, a specific gait of a person walking in a geographic area 110, or a facial structure of a person in a geographic area 110. In response to identifying a respective characteristic associated with a person in a geographic area 110, electronic computing device 150 may track a location of the person within geographic areas 110 based on the identified respective characteristic. In one embodiment, electronic computing device 150 may also electronically store the identified respective characteristic in elapsed time database 160, for example, as an entry in a table corresponding to the person. By identifying respective characteristics in this manner, electronic computing device 150 may not be required to personally identify each person, such as by name or address, to monitor each person in the geographic location, thus protecting the personal identity of each person in a geographic location. In other embodiments, electronic computing device 150 may process information captured by monitoring devices 120 using deep learning models, neural networks, or any combination of image recognition techniques suitable for identifying respective characteristics associated with each person within a geographic area 110.

In one embodiment, electronic computing device 150 may monitor each person within each of the geographic areas 110 based on radio-frequency identification (RFID). In particular, each person located within a geographic location may be assigned a unique RFID tag to be carried or worn while the person moves throughout the geographic location. For example, each person may be given a lanyard that includes an embedded unique RFID tag when entering the geographic location. Each monitoring device 120 deployed throughout geographic areas 110 may include an RFID reader capable of detecting the unique RFID tags to identify a location of each unique RFID tag in each geographic area 110. Once the location of a unique RFID tag is identified, the monitoring device 120 that detected the unique RFID tag may transmit the location and the detected unique RFID to electronic computing device 150. Electronic computing device 150 may use the locations and the respective unique RFIDs detected by the monitoring devices 120 to monitor each person within each of the geographic areas 110. That is, electronic computing device 150 may track a location of each person based on the detected RFIDs. In one embodiment, electronic computing device 150 may also electronically store the unique RFIDs and locations in elapsed time database 160, for example, as entries in a table corresponding to the unique RFID.

In one embodiment, electronic computing device 150 may monitor each person within each of the geographic areas 110 based on the respective locations of mobile computing devices associated with each person. Specifically, electronic computing device 150 may obtain location information for a person in a geographic area 110 from an application executing on a mobile computing device, such as a smartphone or tablet, associated with the person. For example, electronic computing device 150 may determine the location of a smartphone using global positioning system (GPS) or a generated list of cellular towers or local Wi-Fi networks to determine where a person is located. Once location information for the person is obtained, electronic computing device 150 may use the location information to monitor each person within each of the geographic areas 110. In particular, electronic computing device 150 may track a location of the person based on the obtained location information.

In one embodiment, electronic computing device 150 may also electronically store the location information obtained from applications executing on each mobile computing device in elapsed time database 160, for example, as an entry in a table corresponding to the mobile computing device.

In one embodiment, electronic computing device 150 may identify each safety officer 180 within a geographic location. In particular, electronic computing device 150 may receive information captured by monitoring devices 120 and use the captured information to identify one or more respective characteristics associated with each safety officer 180. In one embodiment, electronic computing device 150 may identify a respective characteristic associated with a given safety officer 180 based on visual characteristics as described above. Examples of respective characteristics associated with safety officers 180 in a geographic location may include a uniform worn by a safety officer 180, a badge worn by a safety officer 180, a specific signal or frequency associated with a portable electronic communication device 190 worn by a safety officer 180, a height of a safety officer 180, a specific gait of a safety officer 180 patrolling a geographic location, or a facial structure of a safety officer 180. In response to identifying a respective characteristic associated with a safety officer 180 in a geographic location, electronic computing device 150 may track a location of the safety officer 180 within geographic areas 110 based on the identified respective characteristic. That is, electronic computing device 150 may track each person and each safety officer 180 in a geographic location to identify instances in which persons are within a threshold proximity to a safety officer 180 patrolling the geographic location. In one embodiment, electronic computing device 150 may also electronically store the identified respective characteristic of the safety officer 180 in elapsed time database 160, for example, as an entry in a table corresponding to the safety officer 180. In other embodiments, electronic computing device 150 may identify each safety officer 180 within a geographic location using RFID, information associated with portable electronic communication devices 190 worn by safety officers 180, and/or any suitable combination of the monitoring processes described above.

In one embodiment, electronic computing device 150 may track an elapsed time value for each person in a geographic location. Specifically, electronic computing device 150 may identify when each person enters the geographic location based on information captured by monitoring devices 120. In one embodiment, electronic computing device 150 may determine a respective characteristic associated with a given person that has entered a geographic location and electronically store the respective characteristic as a new entry in elapsed time database 160. Electronic computing device 150 may additionally electronically store an identifier of a geographic area 110 in which the given person has entered and an initial elapsed time value of zero indicating that the given person has recently entered the geographic location. In response to identifying a safety officer 180 patrolling the geographic location as described above, electronic computing device 150 may begin tracking a respective elapsed time value for each person that has entered the geographic location. In one embodiment, electronic computing device 150 may continuously update each entry electronically stored in elapsed time database 160 to indicate a new elapsed time value associated with each person as time progresses. Electronic computing device 150 may additionally update entries in elapsed time database 160 to indicate changing geographic areas 110 as persons move throughout the geographic location. In response to detecting an instance in which a given person is within the threshold proximity to the safety officer 180, electronic computing device 150 may cause the elapsed time value for the given person to be reset to zero. That is, electronic computing device 150 may update an entry associated with the given person in elapsed time database 160 to indicate an elapsed time value of zero in response to the given person being within the threshold proximity to the safety officer 180. In one embodiment, electronic computing device 150 may modify a patrol route for a safety officer 180 based on respective elapsed time values associated with persons in a geographic location. For example, if a respective elapsed time value of any of the persons within a given geographic area 110 exceeds a threshold elapsed time value, electronic computing device 150 may modify a patrol route to indicate, to the safety officer 180, that the safety officer 180 is to patrol the given geographic area 110.

In one embodiment, electronic computing device 150 may determine that a respective characteristic associated with a given person in the geographic location cannot be identified. For example, if the information captured by monitoring devices 120 does not provide adequate information for electronic computing device 150 to determine a respective characteristic for the given person, electronic computing device 150 may determine that a respective characteristic cannot be identified. In response to determining that a respective characteristic for the given person cannot be identified, electronic computing device 150 may electronically store a generic entry in elapsed time database 160 for the given person. Because the given person cannot be identified, electronic computing device 150 may experience difficulties tracking an elapsed time value for the given person. Therefore, electronic computing device 150 may cause the elapsed time value for the given person to be set to a default elapsed time value greater than zero. For example, elapsed time database 160 may include a generic entry including a label of "person 1" in place of a respective characteristic and a default elapsed time value of 12 hours. In one embodiment, electronic computing device 150 may additionally include an identifier of the geographic area 110 in which the given person entered the geographic location in place of an identifier of the current geographic area 110 for the generic entry in elapsed time database 160.

In some embodiments, electronic computing device 150 may modify the respective elapsed time values for persons in a geographic location based on a determined weight. In one embodiment, electronic computing device 150 may identify respective characteristics for each of the persons currently located in a geographic area 110, for example, by accessing data electronically stored in elapsed time database 160. Based on the respective characteristics associated with each of the persons, electronic computing device 150 may determine a weight for each of the persons. The weight for each person may indicate a respective priority for the safety officer 180 to be within a threshold proximity to the person. For example, if a respective characteristic associated with a given person in a geographic area 110 is a medical bracelet (as captured by monitoring devices 120 via, for example, an RFID or image capture sensor), electronic computing device 150 may determine that the given person may be in more frequent need of medical assistance than other persons located in the geographic area 110. Here, electronic computing device 150 may determine a weight to be applied to the elapsed time value for the given person indicating a higher priority, modify the elapsed time value for the given person based on the determined weight, and update the elapsed time value for the given person in elapsed time database 160. In another embodiment, electronic computing device 150 may determine respective weights for persons based on particular geographic areas 110. Specifically, electronic computing device 150 may determine that access to a particular geographic area 110 in a geographic location may be restricted to allow authorized personnel only. If electronic computing device 150 identifies that a given person is currently located within the restricted geographic area 110, electronic computing device 150 may identify the respective characteristics associated with the given person and compare the identified respective characteristics to respective characteristics of authorized personnel, for example, such as a badge, safety helmet, orange vest, and the like. If the respective characteristics associated with the given person do not match the respective characteristics of authorized personnel, electronic computing device 150 may modify the elapsed time value of the given person based on a weight indicating a high priority for the given person to be within the threshold proximity to the safety officer 180.

In one embodiment, electronic computing device 150 may determine respective weights for persons based on an identified age range associated with each person. That is, electronic computing device 150 may identify a respective age range for a given person using information captured by monitoring devices 120 and may apply a weight to the respective elapsed time value of the given person based on the identified respective age range. For example, electronic computing device 150 may apply a weight of 30 minutes to respective elapsed time values of persons under 10 years of age, a weight of 20 minutes for persons between 10 and 20 years of age, a weight of 10 minutes for persons between 20 and 30 years of age, a weight of 1 minute for persons between 30 and 40 years of age, and a weight of 40 minutes for persons over 40 years of age. In one embodiment, electronic computing device 150 may apply a weight to the respective elapsed time value of a given person by multiplying the respective elapsed time value by the determined weight. For example, if a given person between 20 and 30 years of age has an elapsed time value of 40 minutes, electronic computing device 150 may multiply the elapsed time value of the given person by a weight of 10 minutes to yield an elapsed time value of 400 minutes. In another embodiment, electronic computing device 150 may apply a weight to the respective elapsed time value of a given person by adding the weight to the respective elapsed time value. For example, if a given person between 10 and 20 years of age has an elapsed time value of 10 minutes, electronic computing device 150 may add a weight of 20 minutes to the elapsed time value of the given person to yield an elapsed time value of 30 minutes. In other embodiments, electronic computing device 150 may apply a weight to a respective elapsed time value by averaging the weight value and the respective elapsed time value, identifying a percentage in which the respective elapsed time value is within, or over, the weight value, and/or any combination of processes suitable for applying a weight to a respective elapsed time value of a given person.

In some embodiments, electronic computing device 150 may identify respective total elapsed time values for each of the geographic areas 110 in a geographic location. In particular, electronic computing device 150 may access the data electronically stored in elapsed time database 160 indicating the respective elapsed time values for each person in a given geographic area 110. In one embodiment, electronic computing device 150 may determine the sum of each of the respective elapsed time values for each of the geographic areas 110. For example, if geographic area 110-1 shown in FIG. 1 currently includes five persons with respective elapsed time values of 1 hour, 2 hours, 5 hours, 10 hours, and 3 hours, electronic computing device 150 may determine that the total elapsed time value for geographic area 110-1 is 21 hours. In another embodiment, electronic computing device 150 may determine an average of each of the respective elapsed time values for each of the geographic areas 110. For example, if geographic area 110-2 shown in FIG. 1 currently includes three persons with respective elapsed time values of 5 hours, 6 hours, and 7 hours, electronic computing device 150 may determine that the total elapsed time value for geographic area 110-2 is 6 hours. In yet another embodiment, electronic computing device 150 may determine the median of each of the respective elapsed time values for each of the geographic areas 110. For example, if geographic area 110-3 shown in FIG. 1 currently includes five persons with respective elapsed time values of 9 hours, 6 hours, 3 hours, 1 hour, and 5 hours, electronic computing device 150 may determine that the total elapsed time value for geographic area 110-3 is 5 hours. In response to determining the total elapsed time value for each of the geographic areas 110 in a geographic location, electronic computing device 150 may electronically store each respective total elapsed time value in total elapsed time database 195.

In some embodiments, electronic computing device 150 may determine that a patrol route of a safety officer 180 should be modified based on respective elapsed time values and/or total elapsed time values. For example, electronic computing device 150 may access data stored in patrol route database 140 to determine a current patrol route for a given geographic location and modify the current patrol route based on respective elapsed time values and/or total elapsed time values. In one embodiment, electronic computing device 150 may determine that a patrol route for a safety officer 180 should be modified in response to determining that the total elapsed time value for a given geographic area 110 is above a threshold elapsed time value. The threshold elapsed time value may indicate a total elapsed time value after which persons in the given geographic area 110 may begin to feel unsafe having not been within the threshold proximity to the safety officer 180. For example, if the total elapsed time value for geographic area 110-1 shown in FIG. 1 is 21 hours and the threshold total elapsed time value for the geographic location has been designated to be 20 hours, electronic computing device 150 may modify the patrol route of a safety officer 180 patrolling the geographic location to include geographic area 110-1. In another embodiment, electronic computing device 150 may determine that a patrol route for a safety officer 180 should be modified in response to determining that the total elapsed time value for a given geographic area 110 is above the respective total elapsed time values for each of the other geographic areas 110 in the geographic location. For example, if the total elapsed time values for geographic areas 110-1, 110-2, and 110-3 are determined to be 10 hours, 5 hours, and 15 hours, respectively, electronic computing device 150 may modify the patrol route of the safety officer 180 to include geographic area 110-3 when it was not previously included in the patrol route, or may modify the patrol route of the safety officer 180 to raise the order of geographic area 110-3 relative to other geographic areas in the prior patrol route. In another embodiment, electronic computing device 150 may determine that a patrol route for a safety officer 180 should be modified in response to one or more respective elapsed time values for persons in a geographic location exceeding a threshold elapsed time value. For example, if the respective elapsed time values for three persons in geographic area 110-1 are 5 hours, 2 hours, and 11 hours and the threshold elapsed time value associated with the geographic location, or geographic area 110-1, is 10 hours, electronic computing device may modify the patrol route of the safety officer 180 to include geographic area 110-1 such that safety officer 180 may be within a threshold proximity to the person having a respective elapsed time value of 11 hours. Electronic computing device 150 may then transmit the modified patrol route to the safety officer 180, for example, via portable electronic communication device 190. In one embodiment, electronic computing device 150 may additionally update the patrol route electronically stored in patrol route database 140 with the modified patrol route. In one embodiment, in response to detecting an instance in which a safety officer 180 patrols a given geographic area 110, the total elapsed time value for the given geographic area may be reset to zero indicating that each person within the given geographic area 110 was within the threshold proximity to the safety officer 180.

In one embodiment, modified patrol routes transmitted to the portable electronic communication device 190 of the safety officer 180 may include a heatmap indicating total elapsed time values of each geographic area 110. Specifically, electronic computing device 150 may generate a heatmap that includes a visualization of each of the geographic areas 110 and colors indicating the total elapsed time value for each respective geographic area 110. For example, a geographic area 110 having a total elapsed time value above the threshold elapsed time value may be indicated using a red color within the heatmap. In another example, a geographic area 110 having a total elapsed time value approaching the threshold elapsed time value may be indicated using an orange color within the heatmap. In response to detecting an instance in which the safety officer 180 patrols a given geographic area 110, the color indicating the total elapsed time value for the given geographic area 110 may change to a different color, such as blue or indigo, to indicate that the total elapsed time value has been reset to zero. In one embodiment, electronic computing device 150 may overlay each color indicating a total elapsed time value over an image of a geographic location, such as the image electronically stored in patrol route database 140, to generate the heatmap. In one embodiment, the heatmap may be updated in real-time based on total elapsed time values electronically stored in total elapsed time database 195.

In one embodiment, electronic computing device 150 may generate a predicted patrol route for a safety officer 180 based on historical total elapsed time values for a geographic location. The predicted patrol route may indicate a given geographic area 110 predicted to have a total elapsed time value that is above the threshold elapsed time value during a given time of day. In one embodiment, the predicted patrol route for the safety officer 180 may be based on previous total elapsed time values for the given geographic area 110 at the given time of day. In one embodiment, electronic computing device 150 may access historical elapsed time values associated with a given geographic area 110 to identify historical trends, for example, pertaining to a particular time of day, particular day of the week, particular week of the month, particular month of the year, and the like. In one embodiment, the historical elapsed time values associated with a given geographic area 110 may be used as training data for a machine-learned model used to predict the total elapsed time values for the given geographic area 110 during a given time on a given day. Once generated, electronic computing device 150 may transmit the predicted patrol route to the portable electronic communication device 190 of the safety officer 180. If the electronic computing device 150 determines that the total elapsed time value of the given geographic area 110 is above the threshold elapsed time value at the given time of day (as predicted), the electronic computing device 150 may determine that the predicted patrol route is accurate and update the modified patrol route of the safety officer 180 based on the predicted patrol route.

Figure 2A:
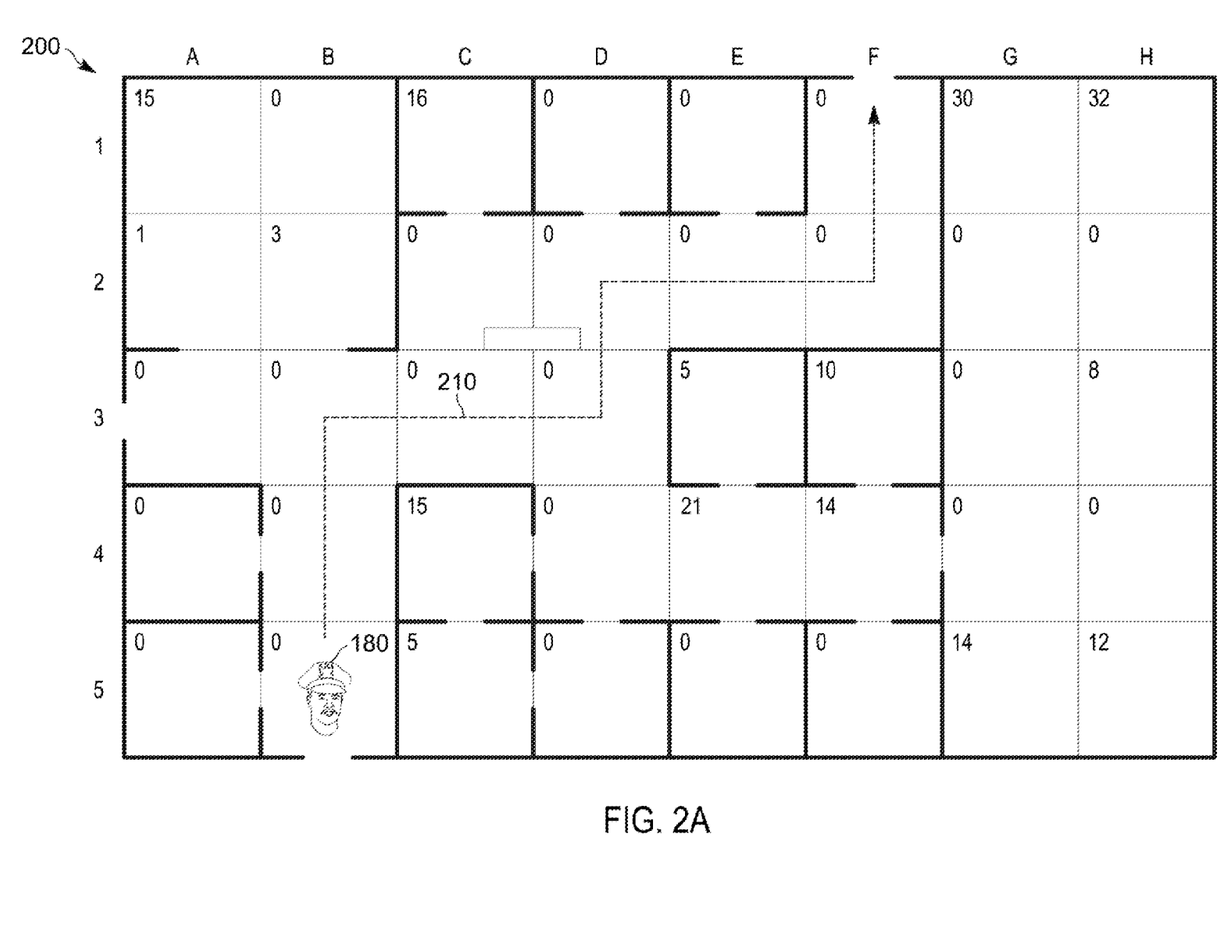
FIGS. 2A and 2B illustrate an example use case of a modified patrol route of a safety officer in an indoor geographic location, in accordance with some embodiments.
Figure 2B:
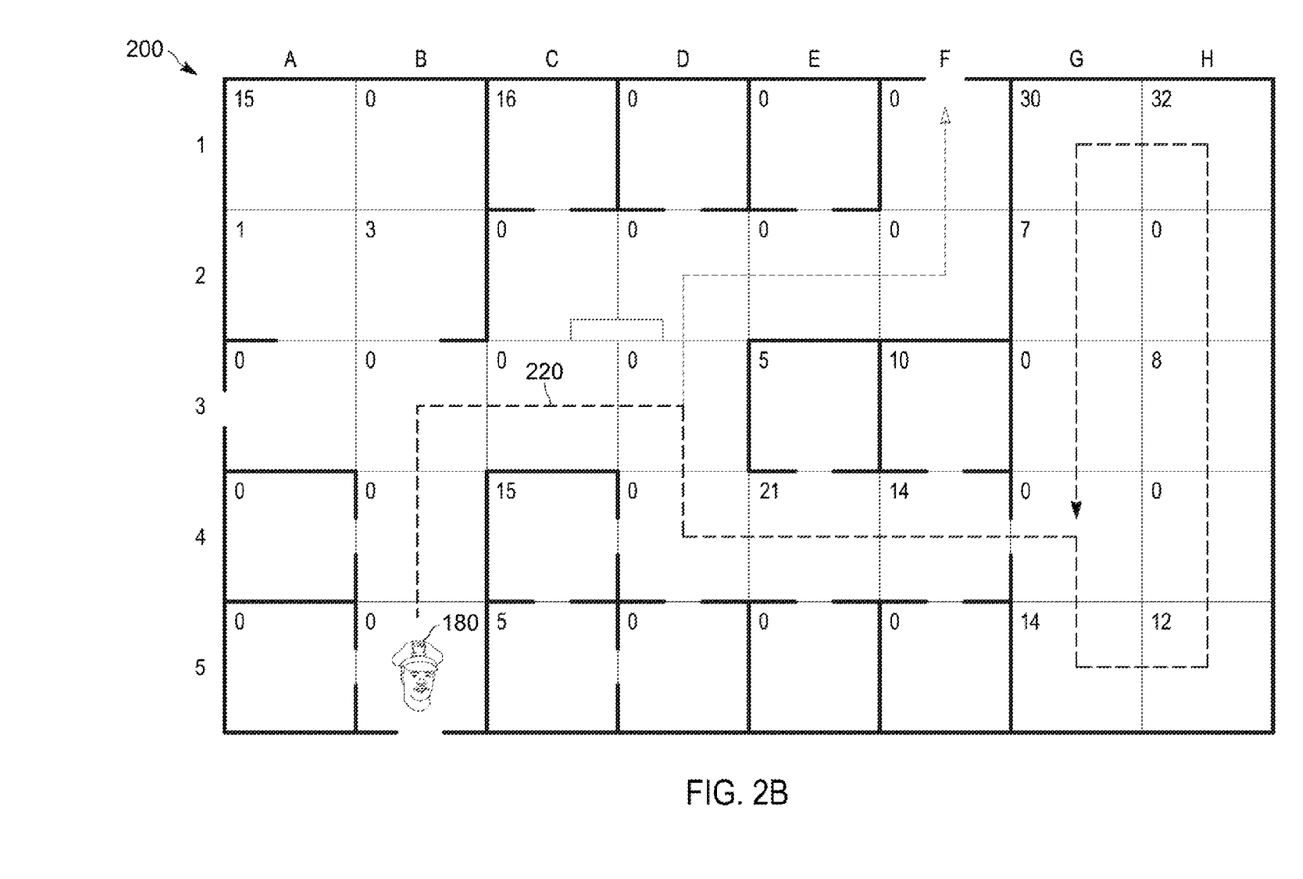

FIGS. 2A and 2B illustrate an example use case of a modified patrol route of a safety officer in an indoor geographic location, in accordance with some embodiments. In the examples illustrated in FIGS. 2A and 2B, indoor geographic location 200 is partitioned according to a grid system in which geographic areas A1 through H5 operate as respective units in a grid of the overall indoor geographic location 200. Here, the entire indoor geographic location 200 may be monitored by the monitoring devices 120 included in respective geographic areas. For example, monitoring devices 120 may be strategically deployed throughout indoor geographic location 200 to monitor one or more geographic areas using the same monitoring device 120. In the examples illustrated in FIGS. 2A and 2B, the total elapsed time values for each of the geographic areas A1 through H5 are shown in the upper left portion of each geographic area and the threshold elapsed time value is 20 hours. Here, electronic computing device 150 may determine an elapsed time value for each person located in indoor geographic location 200 based on a respective characteristic and determine the total elapsed time value for each geographic area based on a sum of each respective elapsed time value as previously described. In one embodiment, indoor geographic location 200 may be an indoor facility such as a shopping mall, nursing home, public high school, office space, municipal building, or any other indoor facility in which a safety officer 180 may implement a patrol route.

In the example illustrated in FIG. 2A, an initial patrol route 210 of safety officer 180 is shown. Specifically, the initial patrol route 210 of safety officer 180 may begin at geographic area B5 and continue through geographic areas B4, B3, C3, D3, D2, E2, F2, and end at F1 where the safety officer 180 may exit the indoor geographic location 200. For example, electronic computing device 150 may transmit the initial patrol route 210 including geographic areas B4, B3, C3, D3, D2, E2, F2, and F1 to the portable electronic communication device 190 of safety officer 180. Portable electronic communication device 190 may electronically receive and store the initial patrol route 210 such that safety officer 180 may use the initial patrol route 210 to patrol the specified route. As illustrated in FIG. 2A, each geographic area patrolled using initial patrol route 210 has a total elapsed time value of zero indicating that the safety officer 180 was within a threshold proximity to persons within the geographic area. Additionally, some geographic areas located near, or adjacent to, the initial patrol route 210 have a total elapsed time value of zero indicating that, within the indoor geographic location 200, the threshold proximity to the safety officer 180 may extend beyond the boundaries of each geographic area. For example, the safety officer 180 may look through the window of a door of geographic area A4 while patrolling the hallway comprised of geographic areas B3 through B5. However, the initial patrol route 210 of safety officer 180 does not include patrolling some geographic areas having a total elapsed time value above the threshold elapsed time value of 20 hours. As shown in FIG. 2A, geographic areas E4, G1, and H1 have total elapsed time values of 21 hours, 30 hours, and 32 hours, respectively. For example, geographic area E4 may include four persons having respective elapsed time value of 5 hours, 8 hours, 2 hours, and 6 hours to yield a total elapsed time value of 21 hours. Geographic area G1 may include five persons each having an elapsed time value of 6 hours to yield a total elapsed time value of 30 hours. Geographic area H1 may include five persons having respective elapsed time values of 8 hours, 7 hours, 9 hours, 2 hours, and 6 hours to yield a total elapsed time value of 32 hours. These total elapsed time values are above the threshold elapsed time value of 20 hours indicating that the initial patrol route 210 of the safety officer 180 should be modified to include the geographic areas.

In the example illustrated in FIG. 2B, a modified patrol route 220 of safety officer 180 is shown. In particular, the modified patrol route 220 may begin at geographic area B5 and continue through geographic areas B4, B3, C3, and D3 similar to the initial patrol route 210. However, the initial patrol route 210 has been modified to include geographic areas D4, E4, F4, G4, G5, H5 through H1, and G1 through G3. For example, electronic computing device 150 may modify the initial patrol route 210 to include geographic areas D4, E4, F4, G4, G5, H5 through H1, and G1 through G3 and transmit the modified patrol route 220 to the portable electronic communication device 190 of safety officer 180. Portable electronic communication device 190 may electronically receive and store the modified patrol route 220 such that safety officer 180 may use the modified patrol route 220 to patrol the specified route. Here, the initial patrol route 210 has been modified to include the geographic areas having total elapsed time values above the threshold elapsed time value. Specifically, electronic computing device 150 has modified the patrol route to include geographic areas E4, G1, and H1 in response to determining that the respective total elapsed time values were above the threshold elapsed time value, for example, as indicated in total elapsed time database 195. As time progresses, the total elapsed time values for geographic areas A1, C1, and C4 may become greater than the threshold elapsed time value as well, and the modified patrol route 220 may be updated to include these geographic areas.

Figure 3A:
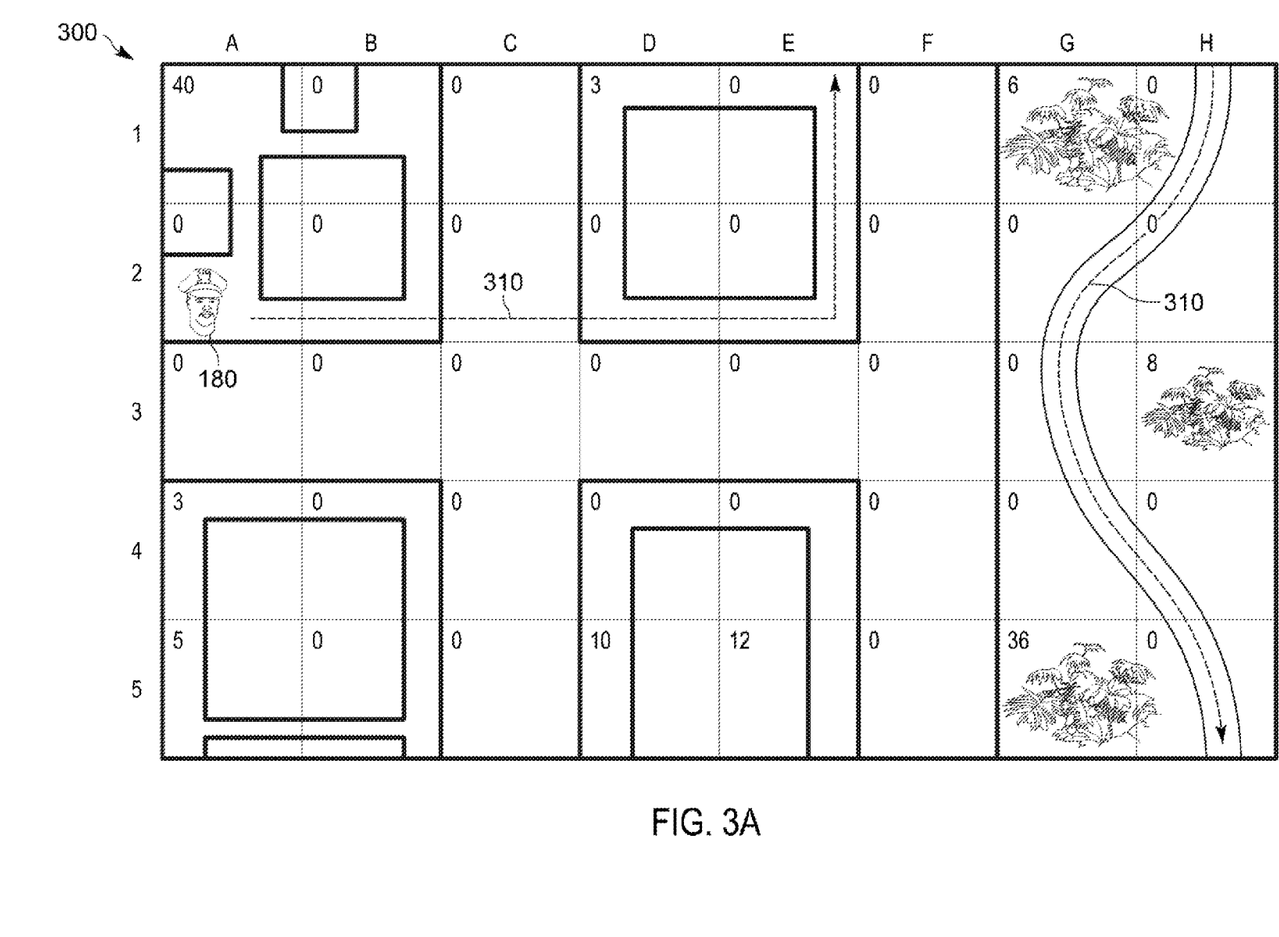
FIGS. 3A and 3B illustrate an example use case of a modified patrol route of a safety officer in an outdoor geographic location, in accordance with some embodiments.
Figure 3B:
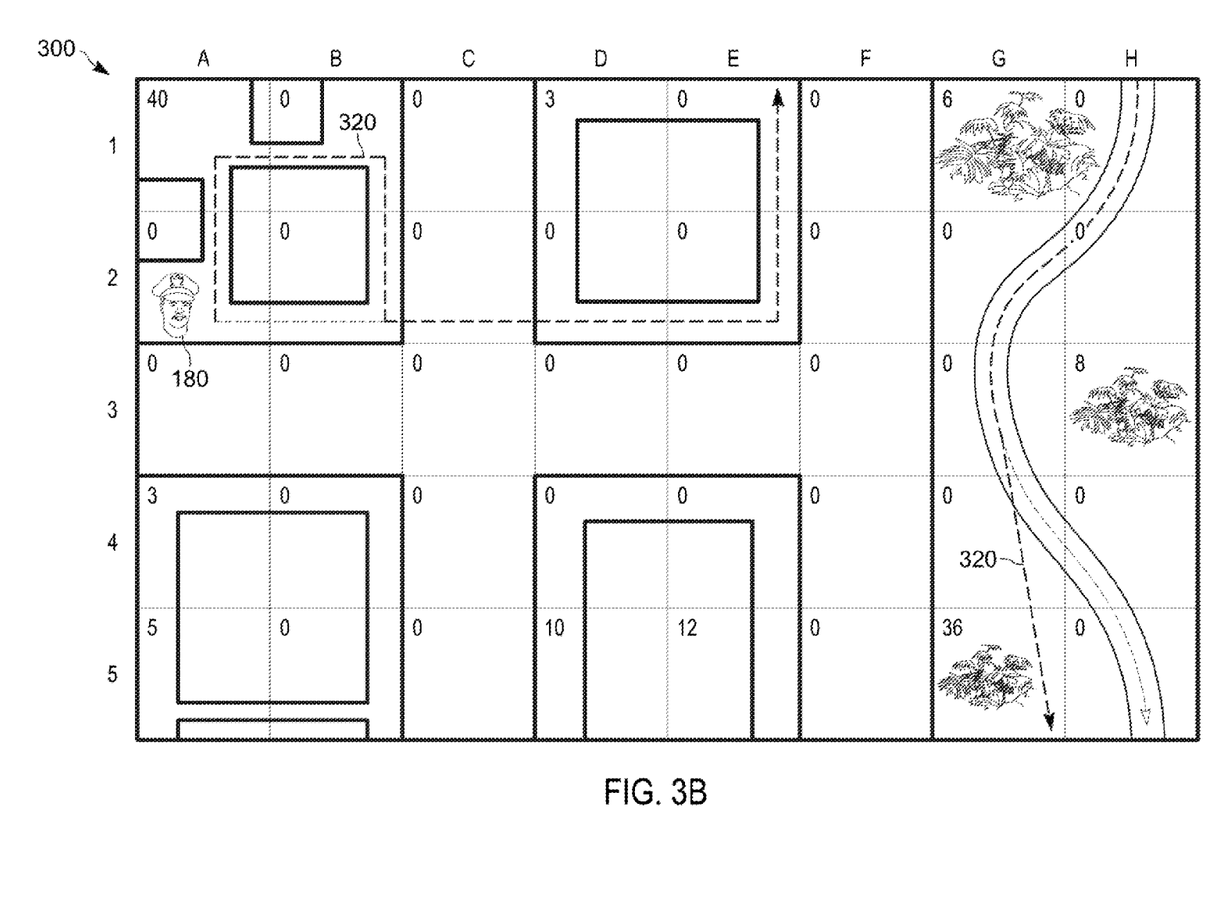

FIGS. 3A and 3B illustrate an example use case of a modified patrol route of a safety officer in an outdoor geographic location, in accordance with some embodiments. In the examples illustrated in FIGS. 3A and 3B, outdoor geographic location 300 is partitioned according to a grid system in which geographic areas A1 through H5 operate as respective units in a grid of the overall outdoor geographic location 300. Here, the entire outdoor geographic location 300 may be monitored by the monitoring devices 120 included in respective geographic areas. For example, monitoring devices 120 may be strategically deployed throughout outdoor geographic location 300 to monitor one or more geographic areas using the same monitoring device 120. In the examples illustrated in FIGS. 3A and 3B, the total elapsed time values for each of the geographic areas A1 through H5 are shown in the upper left portion of each geographic area and the threshold elapsed time value is 30 hours. Here, electronic computing device 150 may determine an elapsed time value for each person located in outdoor geographic location 300 based on a respective characteristic and determine the total elapsed time value for each geographic area based on a sum of each respective elapsed time value as previously described. In one embodiment, outdoor geographic location 300 may be an outdoor area such as a downtown area of a city, a public park, an outdoor shopping mall, a public courtyard, or any other outdoor facility in which a safety officer 180 may implement a patrol route.

In the example illustrated in FIG. 3A, an initial patrol route 310 of safety officer 180 is shown. Specifically, the initial patrol route 310 of safety officer 180 may begin at geographic area A2 and continue through geographic areas B2, C2, D2, E2, and E1. Because the outdoor geographic location 300 is located outdoors, the boundaries defining outdoor geographic location 300 may be more porous than those defined by the property comprising indoor geographic location 200. This is shown in FIG. 3A where the safety officer 180 exits the outdoor geographic location 300 from geographic area E1 and re-enters the outdoor geographic location 300 from geographic area H1. Here, the initial patrol route continues through geographic areas H2, G2 through G4, H4, and H5 where the safety officer 180 again exits the outdoor geographic location 300. For example, electronic computing device 150 may transmit the initial patrol route 310 including geographic areas A2, B2, C2, D2, E2, E1, H1, H2, G2 through G4, H4, and H5 to the portable electronic communication device 190 of safety officer 180. Portable electronic communication device 190 may electronically receive and store the initial patrol route 310 such that safety officer 180 may use the initial patrol route 310 to patrol the specified route. As illustrated in FIG. 3A, each geographic area patrolled using initial patrol route 310 has a total elapsed time value of zero indicating that the safety officer 180 was within a threshold proximity to persons within the geographic area. However, some geographic areas located near, or adjacent to, the initial patrol route 310 have a non-zero total elapsed time value indicating that, within the outdoor geographic location 300, the threshold proximity to the safety officer 180 may not extend beyond the boundaries of each geographic area. For example, the threshold proximity to the safety officer 180 may be small in relation to the expansive outdoor geographic areas. Similar to the initial patrol route 210 shown in FIG. 2A, the initial patrol route 310 of safety officer 180 does not include patrolling some geographic areas having a total elapsed time value above the threshold elapsed time value of 30 hours. As shown in FIG. 3A, geographic areas A1 and G5 have total elapsed time values of 40 hours and 36 hours, respectively. For example, geographic area G5 may include six persons each having an elapsed time value of 6 hours to yield a total elapsed time value of 36 hours. Geographic area A1 may include one person having an elapsed time value of 4 hours. However, geographic area A1 may be private property having access restricted to allow authorized personnel only. As such, electronic computing device 150 has multiplied the elapsed time value by a weight of 10 hours indicating that the person is not authorized to be in the geographic area. The elapsed time value including the applied weight yields a total elapsed time value of 40 hours. These total elapsed time values are above the threshold elapsed time value of 30 hours indicating that the initial patrol route 310 of the safety officer 180 should be modified to include the geographic areas.

In the example illustrated in FIG. 3B, a modified patrol route 320 of safety officer 180 is shown. In particular, the modified patrol route 320 may begin at geographic area A2, exit at geographic area E1, re-enter at geographic area H1, and continue to pass through geographic areas H2, and G2 through G4 similarly to the initial patrol route 310. However, the initial patrol route 310 has been modified to include geographic areas A1 and G5. For example, electronic computing device 150 may modify the initial patrol route 310 to include geographic areas A1, B1, B2, G4, and G5 and transmit the modified patrol route 320 to the portable electronic communication device 190 of safety officer 180. Portable electronic communication device 190 may electronically receive and store the modified patrol route 320 such that safety officer 180 may use the modified patrol route 320 to patrol the specified route. Here, the initial patrol route 310 has been modified to include the geographic areas having total elapsed time values above the threshold elapsed time value. In particular, electronic computing device 150 has modified the patrol route to include geographic areas A1 and G5 in response to determining that the respective total elapsed time values were above the threshold elapsed time value, for example, as indicated in total elapsed time database 195.

In one embodiment, a patrol route may be or include a driven patrol route, such as a specified route to be driven by a vehicle, for example. In particular, geographic areas 110 included in a driven patrol route may be located on, or adjacent to, roads capable of being patrolled by vehicle. In this embodiment, a vehicle electronic computing device may electronically receive the initial patrol route and/or modified patrol route from electronic computing device 150 and cause the vehicle to patrol the specified route. For example, the vehicle electronic computing device may display the received initial patrol route and/or modified patrol route to a driver of the vehicle such that the driver may patrol the specified route.

In one embodiment, a patrol route may be or include an aerial patrol route, such as a specified route to be flown by an aircraft or drone, for example. Specifically, geographic areas 110 included in an aerial patrol route may be located within, or adjacent to, areas capable of being patrolled by air. In this embodiment, an aircraft or drone electronic computing device may electronically receive the initial patrol route and/or modified patrol route from electronic computing device 150 and cause the aircraft or drone to patrol the specified route. For example, the drone electronic computing device may cause the drone to autonomously patrol the specified route.

Figure 4:
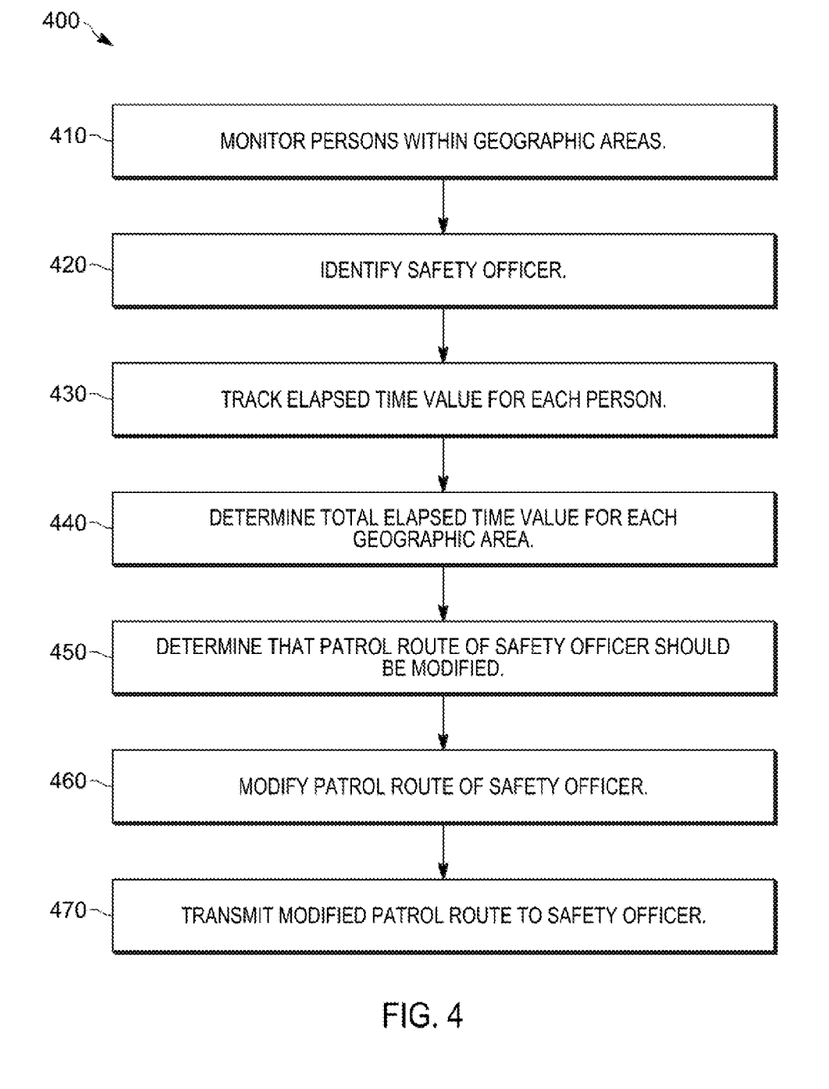
FIG. 4 is a flowchart illustrating selected elements of an example process for modifying and transmitting a patrol route, in accordance with some embodiments.

FIG. 4 is a flowchart illustrating selected elements of an example process for modifying and transmitting a patrol route, in accordance with some embodiments. In at least some embodiments, some or all of the operations shown in FIG. 4 may be performed by a patrol route modification system, such as patrol route modification system 100 illustrated in FIG. 1. In at least some embodiments, the patrol route modification system may include a processor and a memory storing instructions that when executed by the processor cause the processor to perform one or more of the operations illustrated in FIG. 4. In other embodiments, patrol route modification system 100 may include a hardware state machine or other electronic circuitry configured to perform one or more of the operations illustrated in FIG. 4. While a particular order of operations is indicated in FIG. 4 for illustrative purposes, the timing and ordering of such operations may vary where appropriate without negating the purpose and advantages of the examples set forth in detail throughout the remainder of this disclosure.

In this example embodiment, process 400 begins at block 410 with monitoring persons within geographic areas 110. Each person is located in a geographic area 110 and is associated with a respective characteristic. Examples of respective characteristics associated with persons in a geographic location may include an article of clothing currently worn by a person in a geographic area 110, particular markings such as birthmarks or tattoos on a person in a geographic area 110, a height of a person in a geographic area 110, a specific gait of a person walking in a geographic area 110, or a facial structure of a person in a geographic area 110.

At block 420, the process 400 includes identifying a safety officer 180. In particular, electronic computing device 150 may identify a respective characteristic associated with a given safety officer 180 based on visual characteristics. Examples of respective characteristics associated with safety officers 180 in a geographic location may include a uniform worn by a safety officer 180, a badge worn by a safety officer 180, a specific signal or frequency associated with a portable electronic communication device 190 worn by a safety officer 180, a height of a safety officer 180, a specific gait of a safety officer 180 patrolling a geographic location, or a facial structure of a safety officer 180.

At block 430, the process 400 includes tracking an elapsed time value for each of the persons within the geographic areas 110. The elapsed time value indicates a respective quantity of time since a person has been within a threshold proximity to the safety officer 180. For example, an elapsed time value for each of the persons within geographic areas 110 may be tracked by electronic computing device 150 and stored in elapsed time database 160 illustrated in FIG. 1.

At block 440, the process 400 includes determining a total elapsed time value for each of the geographic areas 110. The total elapsed time value may be based on the respective elapsed time values for each of the persons currently located in a geographic area 110. In the example illustrated in FIG. 2A, geographic area E4 may include four persons having respective elapsed time value of 5 hours, 8 hours, 2 hours, and 6 hours to yield a total elapsed time value of 21 hours.

At block 450, the process 400 includes determining that a patrol route of the safety officer 180 should be modified based on the total elapsed time value for each of the geographic areas 110. The modified patrol route indicates, to the safety officer 180, that the safety officer 180 is to patrol a given geographic area 110. For example, electronic computing device 150 may determine that the patrol route of the safety officer 180 should be modified responsive to determining that the total elapsed time value for the given geographic area 110 is above a threshold elapsed time value. The threshold elapsed time value may indicate a total elapsed time value after which persons in the given geographic area 110 may begin to feel unsafe having not been within the threshold proximity to the safety officer 180. In another example, electronic computing device 150 may determine that the patrol route of the safety officer 180 should be modified responsive to determining that the total elapsed time value for the given geographic area 110 is above the respective total elapsed time values for each of the other geographic areas 110.

At block 460, the process 400 includes modifying the patrol route of the safety officer 180. For example, the initial patrol route 210 illustrated in FIG. 2A begins at geographic area B5, continues through geographic areas B4, B3, C3, D3, D2, E2, F2, and ends at geographic area F1. However, the modified patrol route 220 illustrated in FIG. 2B provides an example of how an initial patrol route 210 may be modified to include geographic areas D4, E4, F4, G4, G5, H5 through H1, and G1 through G3. Here, the initial patrol route 210 has been modified to include geographic areas E4, G1, and H1 having total elapsed time values above the threshold elapsed time value.

At block 470, the process 400 includes transmitting modified patrol route to the safety officer 180. For example, electronic computing device 150 may transmit the modified patrol route to the portable electronic communication device 190 of the safety officer 180 illustrated in FIG. 1. In another example, modified patrol routes transmitted to a safety officer 180 may include a heatmap indicating total elapsed time values of each geographic area 110. Here, electronic computing device 150 may generate a heatmap that includes a visualization of each of the geographic areas 110 and colors indicating the total elapsed time value for each respective geographic area 110.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the system or method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus, the following claims are hereby incorporated into the Detailed Description, with each claim standing on its own as a separately claimed subject matter.

We claim:

1. A method for modifying and transmitting patrol routes, the method comprising:
   monitoring, by a plurality of monitoring devices disposed throughout a plurality of geographic areas, a plurality of persons within the plurality of geographic areas, each of the plurality of persons located within a respective geographic area of the plurality of geographic areas, each of the plurality of persons being associated with a respective characteristic;
   receiving by an electronic computing device, information captured by the plurality of monitoring devices;
   identifying, by the electronic computing device, a safety officer;
   tracking, for each of the plurality of persons using the received information, an elapsed time value indicating a respective quantity of time since the person has been within a threshold proximity to the safety officer;
   determining, for each of the plurality of geographic areas, a total elapsed time value for the geographic area based on the respective elapsed time values for each of the plurality of persons currently located in the geographic area;
   determining, based on the total elapsed time value for each of the plurality of geographic areas, that the total elapsed time value is above a threshold elapsed time value;
   modifying the patrol route of the safety officer when the total elapsed time value is above the threshold elapsed time value, the modified patrol route indicating that the safety officer is to patrol a given geographic area of the plurality of geographic areas; and
   transmitting the modified patrol route to a portable electronic communication device associated with the safety officer for display.

2. The method of claim 1, wherein determining that the total elapsed time value is above the threshold elapsed time value comprises:
   determining that the total elapsed time value for the given geographic area of the plurality of geographic areas is above the threshold elapsed time value.

3. The method of claim 1, wherein determining that the total elapsed time value is above the threshold elapsed time value comprises:
   determining that the total elapsed time value for the given geographic area of the plurality of geographic areas is above the respective total elapsed time values for each of the plurality of geographic areas.

4. The method of claim 1, further comprising:
   detecting, by the electronic computing device, an instance in which a given person of the plurality of persons is within the threshold proximity to the safety officer; and
   causing the elapsed time value for the given person to be reset to zero.

5. The method of claim 1, wherein, for each of the plurality of geographic areas, determining the total elapsed time value comprises at least one of:
   determining a sum of the respective elapsed time values for each of the plurality of persons currently within the geographic area;
   determining an average of the respective elapsed time values for each of the plurality of persons currently within the geographic area; and
   determining a median of the respective elapsed time values for each of the plurality of persons currently within the geographic area.

6. The method of claim 1, wherein monitoring the plurality of persons within the plurality of geographic areas comprises, for at least one of the plurality of persons:
   identifying the respective characteristic of the person; and
   tracking a location of the person within the plurality of geographic areas based on the identified respective characteristic.

7. The method of claim 1, wherein monitoring the plurality of persons within the plurality of geographic areas comprises, for at least one of the plurality of persons:
   detecting a radio-frequency identification (RFID) associated with the person, the RFID being stored in an electronic tag associated with the person; and
   tracking a location of the person based on the detected RFID.

8. The method of claim 1, wherein monitoring the plurality of persons within the plurality of geographic areas comprises, for at least one of the plurality of persons:
   obtaining, from an application executing on a mobile computing device associated with the person, location information for the person; and
   tracking a location of the person based on the obtained location information.

9. The method of claim 1, further comprising:
   generating, by the electronic computing device, a predicted patrol route for the safety officer at a given a time of day, the predicted patrol route indicating a given geographic area of the plurality of geographic areas predicted to have a total elapsed time value that is above a threshold elapsed time value at the given time of day;
   transmitting the predicted patrol route to the safety officer;
   determining that the total elapsed time value of the given geographic area is above the threshold elapsed time value at the given time of day; and
   in response to determining that the total elapsed time value is above the threshold elapsed time value at the given time of day, updating the modified patrol route of the safety officer based on the predicted patrol route.

10. The method of claim 1, wherein transmitting the modified patrol route to the safety officer includes:
    transmitting a heatmap to a portable electronic communication device associated with the safety officer for display, the heatmap including a visualization of the plurality of geographic areas and a plurality of colors, each of the plurality of colors indicating the total elapsed time value for a respective geographic area.

11. The method of claim 1, wherein monitoring the plurality of persons in the plurality of geographic areas further comprises:
    determining that the respective characteristic associated with a given person of the plurality of persons cannot be identified by the electronic computing device; and
    causing the elapsed time value for the given person to be set to a default elapsed time value greater than zero.

12. The method of claim 1, wherein, for each of the plurality of geographic areas, determining the total elapsed time value for the geographic area further comprises:
    identifying, for each of the plurality of persons currently located in the geographic area, the respective characteristic associated with the person;
    determining, for each of the plurality of persons currently located in the geographic area, a weight indicating a respective priority for the safety officer to be within the threshold proximity to the person, the weight based on the identified respective characteristic associated with the person; and modifying, for each of the plurality of persons currently located in the geographic area, the respective elapsed time value for the person dependent on the determined weight.

13. A computer readable medium storing program instructions executable by a processor for performing:

receiving captured information about a plurality of persons from a plurality of monitoring devices disposed throughout a plurality of geographic areas;

monitoring the plurality of persons within the plurality of geographic areas using the received captured information, each of the plurality of persons located within a respective geographic area of the plurality of geographic areas, each of the plurality of persons being associated with a respective characteristic;

identifying a safety officer;

tracking, for each of the plurality of persons using the received captured information, an elapsed time value indicating a respective quantity of time since the person has been within a threshold proximity to the safety officer;

determining, for each of the plurality of geographic areas, a total elapsed time value for the geographic area based on the respective elapsed time values for each of the plurality of persons currently located in the geographic area;

determining, based on the total elapsed time value for each of the plurality of geographic areas, that the total elapsed time value is above a threshold elapsed time value;

modifying a patrol route of the safety officer when the total elapsed time value is above the threshold elapsed time value, the modified patrol route indicating that the safety officer is to patrol a given geographic area of the plurality of geographic areas; and transmitting the modified patrol route to a portable electronic communication device associated with the safety officer for display.

14. The computer readable medium of claim 13, wherein determining that the total elapsed time value is above the threshold elapsed time value comprises:

determining that the total elapsed time value for the given geographic area of the plurality of geographic areas is above the threshold elapsed time value.

15. The computer readable medium of claim 13, wherein determining that the total elapsed time value is above the threshold elapsed time value comprises:

determining that the total elapsed time value for the given geographic area of the plurality of geographic areas is above the respective total elapsed time values for each of the plurality of geographic areas.

16. The computer readable medium of claim 13, wherein the instructions are further executable by the processor for:

detecting an instance in which a given person of the plurality of persons is within the threshold proximity to the safety officer; and causing the elapsed time value for the given person to be reset to zero.

17. A patrol route modification system, comprising:

a plurality of monitoring devices disposed throughout a plurality of geographic areas;

an electronic computing device configured to:

receive captured information about a plurality of persons from the plurality of monitoring devices;

monitor the plurality of persons within the plurality of geographic areas, each of the plurality of persons located within a respective geographic area of the plurality of geographic areas, each of the plurality of persons being associated with a respective characteristic;

identify, by the electronic computing device, a safety officer;

track, for each of the plurality of persons using the received captured information, an elapsed time value indicating a respective quantity of time since the person has been within a threshold proximity to the safety officer;

determine, for each of the plurality of geographic areas, a total elapsed time value for the geographic area based on the respective elapsed time values for each of the plurality of persons currently located in the geographic area;

determine, based on the total elapsed time value for each of the plurality of geographic areas, that the total elapsed time value is above a threshold elapsed time value;

modify the patrol route of the safety officer when the total elapsed time value is above the threshold elapsed time value, wherein the modified patrol route indicating that the safety officer is to patrol a given geographic area of the plurality of geographic areas; and transmit the modified patrol route to a portable electronic communication device associated with the safety officer for display.

18. The patrol route modification system of claim 17, wherein to determine that the total elapsed time value is above the threshold elapsed time value, the electronic computing device is further configured to:

determine that the total elapsed time value for the given geographic area of the plurality of geographic areas is above the threshold elapsed time value.

19. The patrol route modification system of claim 17, wherein to determine that the total elapsed time value is above the threshold elapsed time value, the electronic computing device is further configured to:

determine that the total elapsed time value for the given geographic area of the plurality of geographic areas is above the respective total elapsed time values for each of the plurality of geographic areas.

20. The patrol route modification system of claim 17, wherein the electronic computing device is further configured to:

detect an instance in which a given person of the plurality of persons is within the threshold proximity to the safety officer; and cause the elapsed time value for the given person to be reset to zero.

* * * * *